United States Patent [19]

Breen

[11] 4,420,789
[45] Dec. 13, 1983

[54] CHARACTERISTIC TIMER FOR A PROTECTIVE RELAY

[75] Inventor: Thomas B. Breen, Lansdowne, Pa.

[73] Assignee: General Electric Company, King of Prussia, Pa.

[21] Appl. No.: 369,440

[22] Filed: Apr. 19, 1982

[51] Int. Cl.$^3$ ............................................. H02H 3/093
[52] U.S. Cl. ........................................ 361/94; 361/96; 361/85; 328/111; 307/234; 307/592
[58] Field of Search .................... 361/94, 95, 96, 97, 361/31, 93, 85, 196; 328/111, 110, 109, 136; 307/324, 592

[56] References Cited

U.S. PATENT DOCUMENTS

| 4,180,842 | 12/1979 | Keeney | 361/85 |
|---|---|---|---|
| 4,191,847 | 3/1980 | Mayer | 328/111 X |
| 4,219,860 | 8/1980 | DePuy | 361/96 X |
| 4,271,449 | 6/1981 | Grogan | 361/94 |

Primary Examiner—Patrick R. Salce
Attorney, Agent, or Firm—John P. McMahon; William Freedman

[57] ABSTRACT

A characteristic timer for a protective relay utilized as part of a system that provides protection for a portion of a high voltage transmission line is disclosed. The characteristic timer provides a time-base for measuring the duration of a signal developed by the protective relay indicative of a normal or an abnormal condition related to the protective portion of the high voltage transmission line. The characteristic timer is comprised of digital devices, such as; programmable counters for preselecting the frequency related limits to which the developed signal is compared, counters that monitor the duration and presence of the developed signal, and a shift register that controls the resetting of the characteristic timer. If the developed signal is disrupted for a predetermined time the shift register resets the digital devices and awaits for the reoccurrence of the developed signal for a revised determination of its time duration. Conversely, if the disruption is less than the predetermined time the shift register allows the timer to continue its monitoring of the status signal to determine its frequency related duration. The characteristic timer also has means for enhancing the resetting time of the protective relay.

4 Claims, 21 Drawing Figures

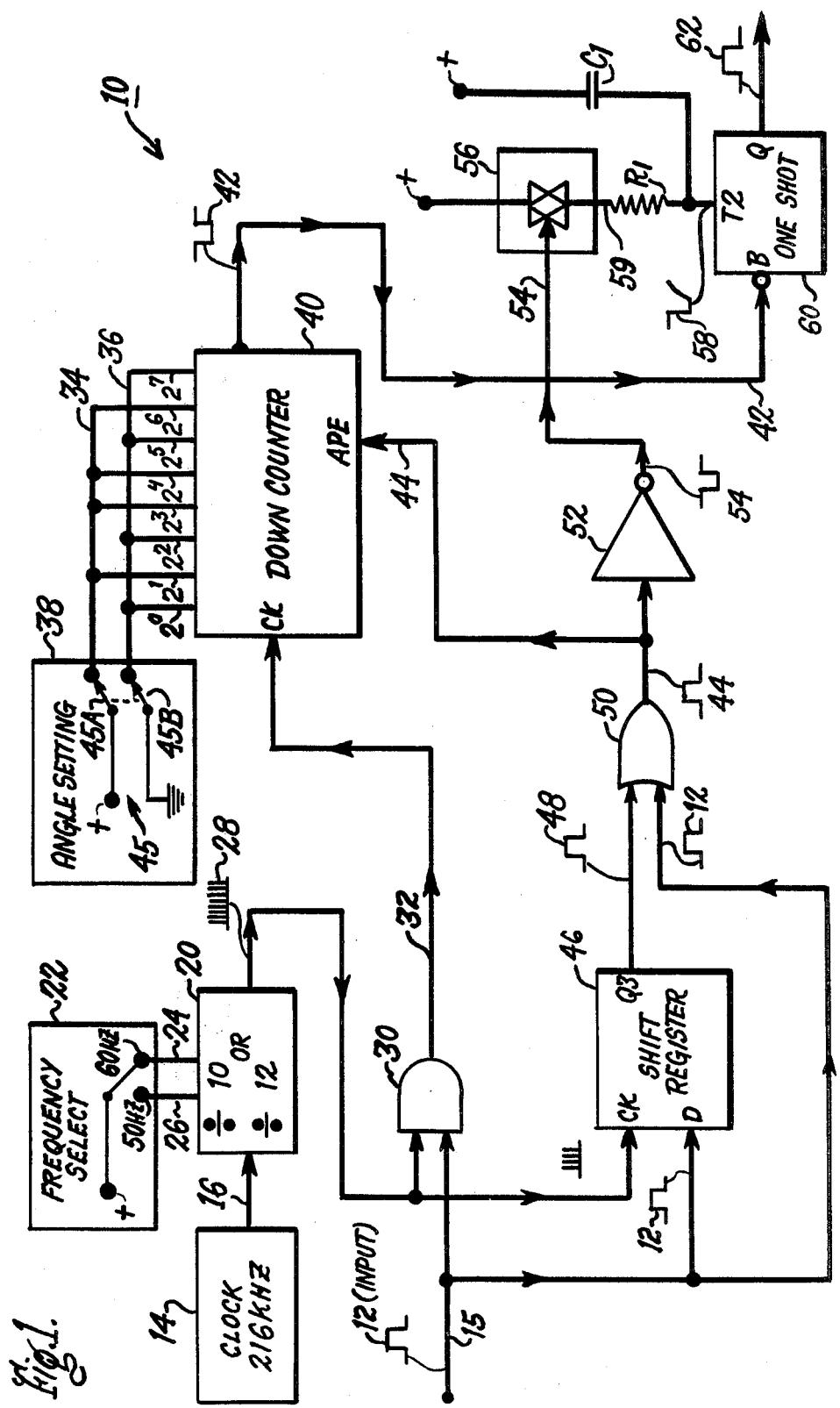

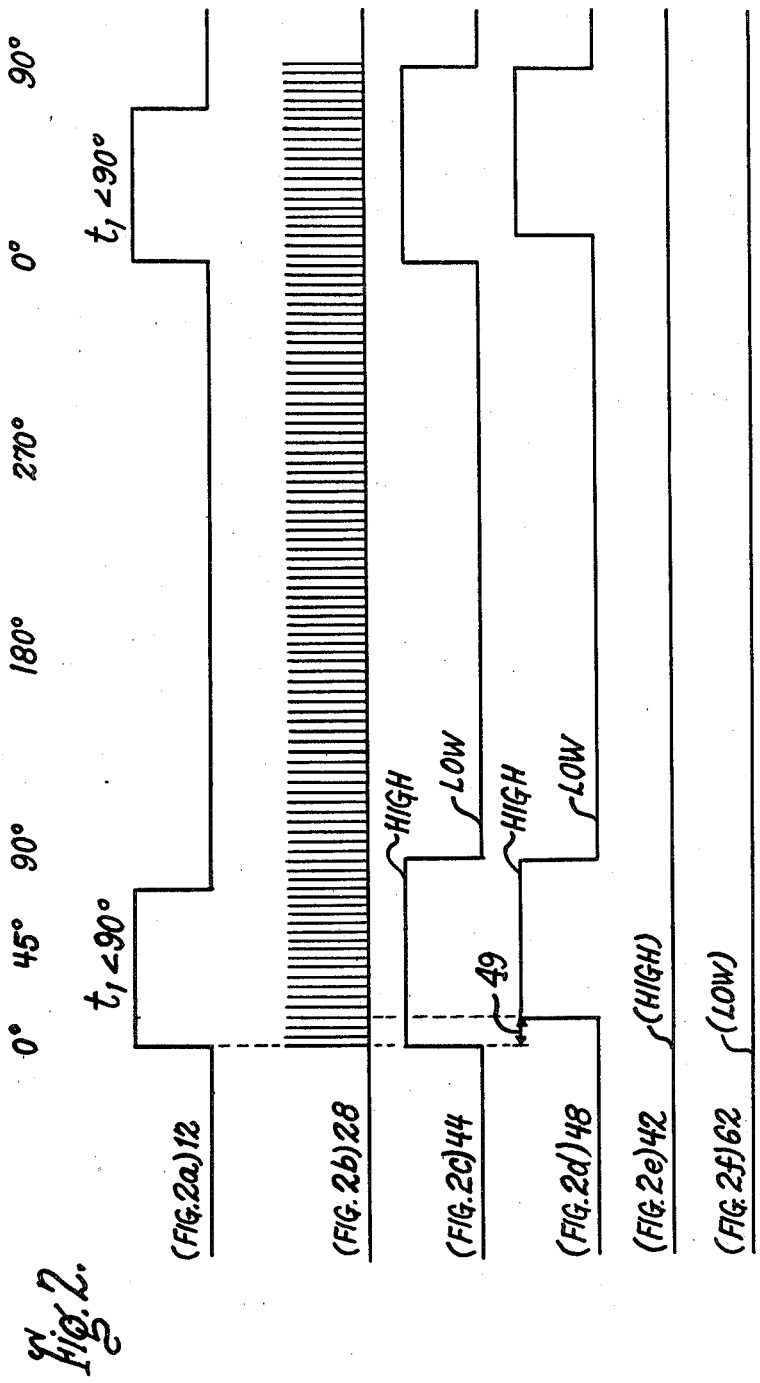

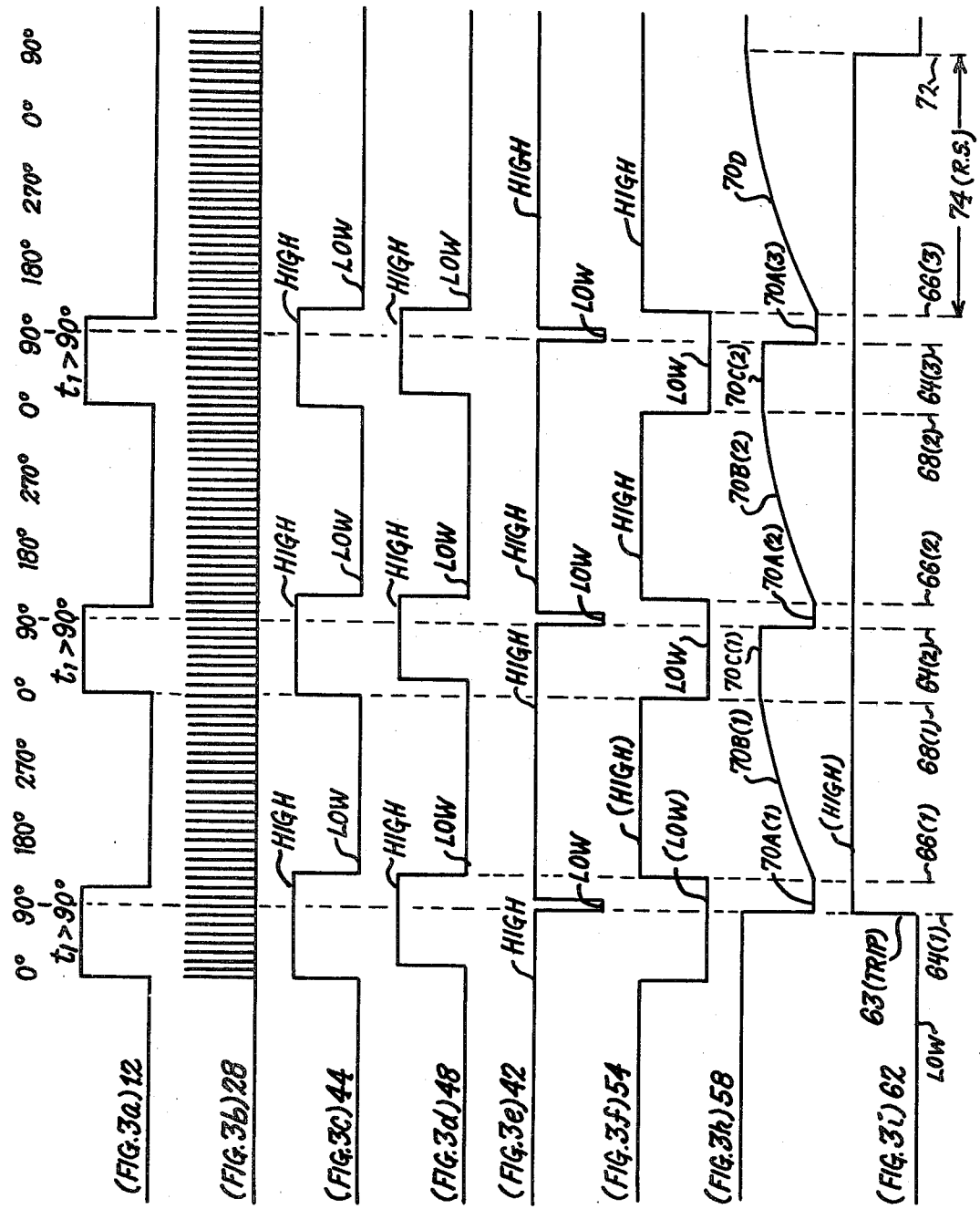

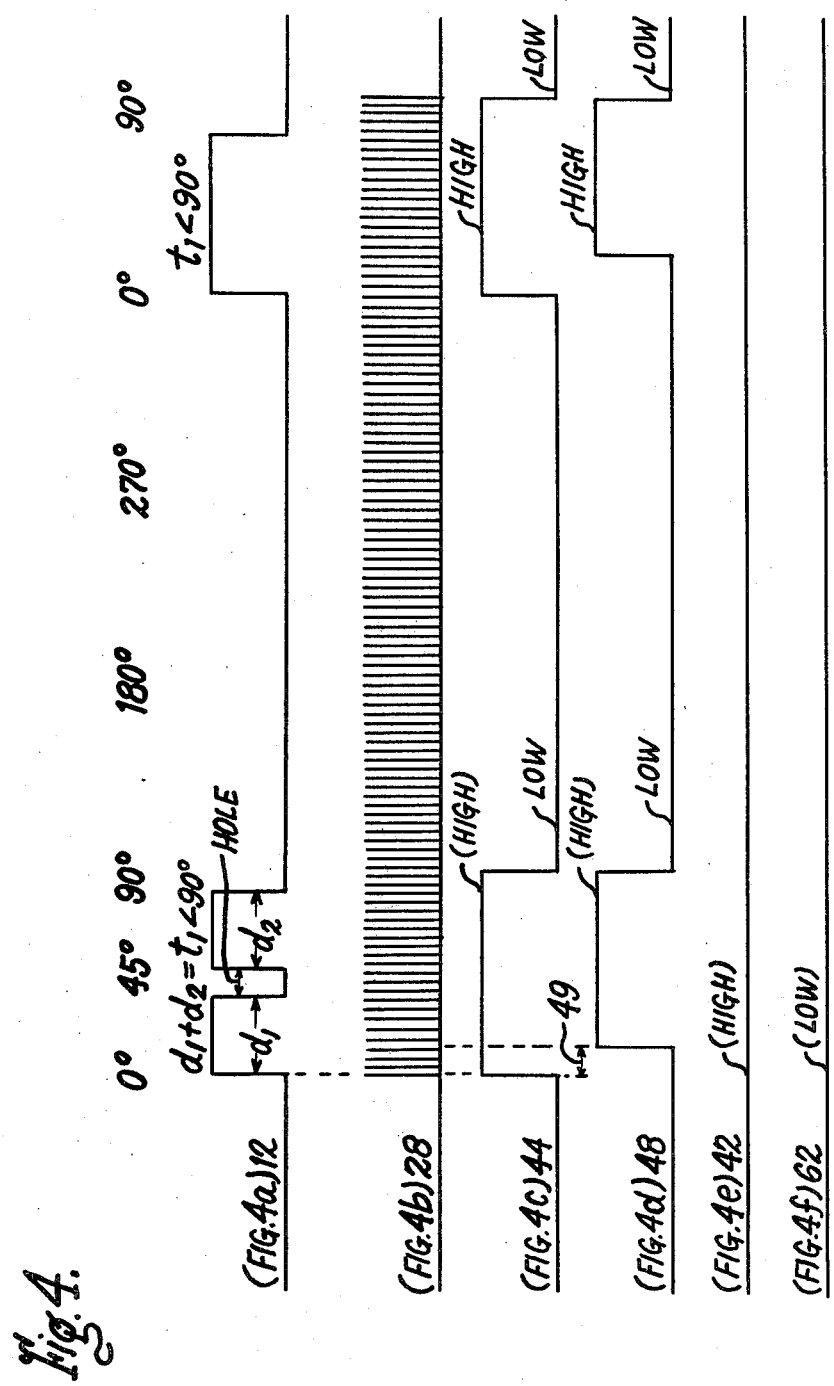

CHARACTERISTIC TIMER FOR A PROTECTIVE RELAY

BACKGROUND OF THE INVENTION

This invention relates to a timer, and more particularly, to a characteristic timer for a protective relay utilized for the protection of a portion of a high voltage transmission line.

Protective relays are commonly employed to detect and respond to faults that may occur within a protected portion of a high voltage transmission line. The output stage of the protective relay frequently employs a characteristic timer having a specified activating time response to a coincidence-type developed signal generated by the protective relay. The characteristic timer typically controls the output of the protective device. If the duration of the coincidence signal equals or exceeds the specified setting or activation time of the characteristic timer the circuit breaker is activated and the protected portion is decoupled from the remainder of the high voltage transmission line.

The specified activation time is typically dependent upon the frequency of the alternating current conducted by the high voltage transmission line and the required protective characteristic shape. The protective relay may desire to generate an alarm signal when the phase coincidence between two sensed signals of the protective portion equals or exceeds 90 degrees. The 90 degree relationship is related to the frequency of the A.C. source. For example, for a 60 Hz A.C. source one cycle of 360 degrees has a duration of 1/60 Hz. or 16.66 msec, so that a 90° phase coincidence has a duration of 16.64/4 msec or 4.16 msec. Similar manipulations for a 50 Hz signal reveals that a 90 degree relationship has a value of 5.0 msec. It is considered desirable that the characteristic timer of the protective relay have means for which its setting time and angular relationship may be easily altered so as to easily adapt the protective relay to various high voltage transmission lines conducting or transmitting various alternating current.

The characteristic timer typically located in the output stage of the protective relay provides the final response of the protective relay to an abnormal condition within the protected portion of the high voltage transmission line. The protective relay may employ a phase comparator method for determining an abnormal condition of the high voltage transmission and generating a representative signal which is applied to the characteristic timer. The phase comparator method may provide a representative output signal to the characteristic timer when phase coincidence between a polarizing signal $V_{POL}$ and an operate signal $V_{OP}$ exists. The pulse width of the waveshape of the phase coincidence output signal may be in the form of blocks spaced apart by "holes". It is desired that the activation time of the characteristic timer be primarily determined by the pulse width of the blocks and have means to compensate for the pulse width indicative of the holes.

One such timer is described in U.S Pat. No. 4,180,842 of M. F. Keeney, issued Dec. 25, 1979, assigned to the same assignee of the present invention and herein incorporated by reference. It is still considered desirable that the characteristic timer be provided with inherent or built-in error detection means so as to filter or discriminate against the "holes" that might be generated by the phase comparator circuit of the protective relay.

Furthermore, the characteristic timer being located in the output stage of the protective relay adds to the "dropout time" or "resetting time" of the protective relay. The dropout or resetting time determines, in part, the speed of response of the protective relay scheme. Accordingly, lowering the resetting time enhances the speed of response of the protective relay scheme. It is considered desirable to provide a characteristic timer having a relatively short resetting time so as to enhance the overall response to the protective scheme which includes other protective functions such as circuit breaker failure.

It is one object of the present invention to provide a characteristic timer for which its activation time is easily alterable so as to adapt the protective relay to various high voltage transmission lines transmitting various alternating current.

It is another object of the present invention to provide a characteristic timer having means to discriminate or ride over transients or "holes" that may appear in phase coincidence signal developed by a phase comparator method of a protective relay so as to provide an output response for a protective relay which is substantially free of error.

It is a further object of the present invention to provide a characteristic timer that contributes to a relatively short resetting time so as to enhance the speed of response to the protective relay scheme.

It is a still further object of the present invention to provide a characteristic timer comprised of digital devices.

These and other objects of the invention will become apparent to those skilled in the art upon consideration of the following description of the invention.

SUMMARY OF THE INVENTION

This invention is directed to a characteristic timer for a protective relay of a protective relay scheme that provides protection for a transmission line.

The characteristic timer measures the time duration of an applied signal representative of normal or abnormal conditions of a portion of a transmission line associated with the protective relay. The characteristic timer measures the time duration of the applied signal relative to the frequency of the power source supplying the transmission line. The characteristic timer comprises: (a) means including a clock source for developing a first output signal having a frequency proportional to the frequency of the power source; (b) means responsive to coincidence between the applied signal and the first output signal for generating a second output signal having a frequency equal to the frequency of a first output signal when there is coincidence between the applied signal and the first output signal; (c) selectable means for selecting a first digital signal representative of a desired angle within the range of 0 to 180 degrees of one cycle of the frequency of the power source; (d) means for developing a third output signal in response to the occurrence of a hole in said applied signal having a duration exceeding a predetermined maximum; (e) a digital counter for receiving the second and third output signals and the first digital signal and having: (1) an initial digital content established in response to the first digital signal, (2) a digital content that is altered in response to the second output signal, (3) a digital content that is unconditionally resettable to its initial digital content in response to an absence following the presence of the third output signal, and (4) means for generating a fourth output signal upon the occurrence of its digital content being altered to a predetermined quantity; and; (f) means responsive to the fourth output signal for developing a fifth output signal that extends past termination of the fourth output signal.

The features of the invention believed to be novel are set forth with particularity in the appended claims. The invention, itself, however, both as to its organization and operation, together with further objects and advantages thereof, may best be understood by reference to the following description taken in conjunction with the accompanying drawings.

BRIEF DESCRIPTION OF THE DRAWINGS

FIG. 1 is a block diagram of a circuit arrangement of a characteristic timer in accordance with the present invention.

FIGS. 2, 3, and 4 are timing diagrams related to the operation of the circuit arrangement of FIG. 1.

DETAILED DESCRIPTION OF THE PREFERRED EMBODIMENT

FIG. 1 is a block diagram of a characteristic timer 10 in accordance with the present invention. The characteristic timer 10 is typically located in the output stage of a protective relay (not shown). The protective relay typically forms part of a scheme or system for protecting one or more portions of a transmission line (not shown).

In general, the characteristic timer 10 develops an output signal 62 when the pulse width of the applied signal 12, developed by the protective relay (not shown), equals or exceeds a preselected limit indicative of an abnormal condition of the transmission line. Also, the terminal portion of the pulse duration of the output signal 62 is controlled so as to enhance the resetting time of the protective relay and the scheme or system in which the protective relay is used. The output signal 62 is typically routed to an external source, such as a circuit breaker, which when commanded by signal 62 isolates the protected portion from the remainder of the transmission line.

The applied signal 12 is developed by a portion (not shown) of the protective relay which monitors and responds to faults that may occur within a protected portion of the transmission line. One such protective relay is described in U.S. patent application Ser. No. 309,549 of L. P. Cavero, filed Oct. 7, 1981. U.S. patent application Ser. No. 309,549 is assigned to the same assignee of the present invention and is incorporated herein by reference. U.S. patent application Ser. No. 309,549 describes the development of signals such as $V_{POL1}$ and $V_{OP1}$ having a desired phase relationship. The $V_{POL1}$ and $V_{OP1}$ are applied to an AND circuit 61 having an output, which, in turn, is applied to a TIMER 63, which, in turn, determines a trip command to an external breaker associated with a protected portion of a high voltage transmission line. The output signal of AND circuit 61 of U.S. patent application Ser. No. 309,549 is similar to the applied signal 12 discussed for this invention, and further the function or usage of the TIMER 63 of U.S. patent application Ser. No. 309,549 is similar to the usage of the characteristic timer 10 of the present invention in a protective relay.

The protective relay upon detection of a phase coincidence between two signals such as $V_{POL1}$ and $V_{OP1}$ generates the signal 12 which is then applied to the characteristic timer 10 of FIG. 1. The characteristic timer 10 develops its output signal 62 after an expiration of the preselected limit relative to the occurrence of signal 12. The preselected limit is related to the pulse width of applied signal 12, which, in turn, is further related to the frequency of the A.C. power source supplying the transmission line. For example, a pulse width of signal 12 having a time duration of 4.16 msec corresponds to 90° of one-cycle of a 60 Hz power source. Similarly, a pulse width of approximately 5.0 msec corresponds to 90° of one cycle of a 50 HZ power source.

The pulse duration of the applied signal 12 is monitored and measured by the characteristic timer 10 of FIG. 1. The characteristic timer 10 has a plurality of elements listed in Table 1 according to the reference number logic function, and typical type.

TABLE 1

| Element | Logic Function | Typical Type |
|---------|---------------|--------------|
| 20 | Divide Counter | Motorola type 4526 |
| 40 | Down Counter | RCA Type 40103 |
| 46 | Shift Register | RCA Type 4015 |
| 56 | Analog Switch | RCA Type 4016 |
| 60 | One-shot | RCA Type 4538 |

A clock source 14 of FIG. 1 generates a clock frequency signal of 216 KHz derived from a crystal type oscillator having a typical base accuracy of ±0.001%. The clock source 14 may also be a phase locked loop circuit using the line frequency as an input to develop the desired 216 KHz clock frequency signal.

The signal 12 is applied to a signal path 15 of FIG. 1. Signal 12 is routed, via signal path 15, to the D input of shift register 46 and to a first input of an AND circuit 30. The AND circuit 30 has a second input which has applied to it a train of pulses 28. The train of pulses 28 is a first output signal generated by the Divide Counter 20.

Divide counter 20 has as its input, on a signal path 16, the output of the clock source 14 which is a 216 KHz clock-type signal. Divide Counter 20 performs one of two operations, (1) for an applied signal 12 related to a 60 Hz application it divides the 216 KHZ clock signal by a factor of 10 so as to produce an output signal 28 having a repetition rate of 21.6 KHz, or (2) for an applied signal 12 related to a 50 Hz application, it divides the 216 KHz clock signal by a factor of 12 so as to produce an output signal 28 having a repetition rate of 18.0 KHz. The selection of divide by 10 or divide by 12 is accomplished by selectable means 22.

Selectable means 22 is designated in FIG. 1 as FREQUENCY SELECT. Although, two positions 50 HZ and 60 HZ are shown for FREQUENCY SELECT others may be provided if desired. Selectable means 22 may be a manual type switch, shown in FIG. 1 as arm 25, having one end connected to a positive (+) power source and its other end selectably connected to signal path 24 (60 HZ) or 26 (50 HZ). The application of the positive (+) power source to signal path 24 cause Divide Counter 20 to divide by 10, and similarly, the application of the positive (+) power source to signal path 26 cause Divide Counter 20 to divide by 12. The Divide Counter 20 responsive to clock source 14 and to the selectable means 22 generates the first output signal 28 which is applied to the second input of AND circuit 30.

The AND circuit 30 generates a second output signal on signal 32 in response to the coincidence between the applied signal 12 and the first output signal 28. The second output signal on signal path 32 is applied to the clock (CK) input of a Down Counter 40.

In general, Down Counter 40 provides the means for receiving the second output signal, a third output signal 44, a first digital signal and has: (1) an initial digital content established in response to the voltage levels applied to signal path 34 and 36 by angle setting means 38, which as is to be described, are representative of the first digital signal indicative of a desired angle, (2) a digital content that is altered in response to the occurrence of the second output signal on signal path 32, (3) a digital content that is unconditionally resettable to its initial digital content in response to the absence following the presence of the third output signal 44, to be described, and (4) means for generating a fourth output signal 42 upon the occurrence of its digital content being altered to a predetermined quantity.

Angle setting means 38 is shown as comprising a manual type switch 45 having two ganged together arms 45A and 45B respectively connected to signal path 34 and signal path 36. The other side of arm 45A is connected to a positive (+) potential, whereas, the other side of arm 45B is connected to a negative potential. The positive potential applied to signal path 34 represents a logic "1" when applied to Down Counter 40, whereas, the negative potential applied to signal path 36 represents a logic "0" when applied to Down Counter 40. Signal path 34 is shown as applied to $2^1$, $2^3$, $2^4$ and $2^6$ inputs of the Down Counter 40, whereas, signal path 36 is shown as applied to $2^0$, $2^5$, and $2^7$ inputs of Down Counter 40. For such arrangement of the angle setting means shown in FIG. 1, in particular for the levels applied to signal paths 34 nd 36, the signal applied to Down Counter 40 is a binary 90 and is representative of a desired angle of 90° of phase duration to which the applied signal 12 is compared. Although a single manual switch 45 is shown as setting the desired angle of 90°, in actuality eight separate switches, one for each input $2^0$, $2^1$, $2^2$, $2^3$, $2^4$, $2^5$, $2^6$ and $2^7$, are provided in order to individually set each of the inputs $2^0$, $2^1$, $2^2$, $2^3$, $2^4$, $2^5$, $2^6$ and $2^7$ to a logic "1" or a logic "0" so that a plurality of desired angles may be selected one at a time. The single manual switch 45 is shown in FIG. 1 for simplicity purposes.

The Down Counter 40 is unconditionally reset by the negative going lagging edge of the third output signal 44, to be described with regard to FIG. 3c, applied to an Asynchronous Preset Enable (APE) input of the Down Counter 40. The third output signal 44 is developed by an OR circuit 50 having as one of its inputs the output of Shift register 46.

Shift register 46 has two inputs, (1) a clock (CK) input having applied to it the first output signal 28 and (2) the D input having applied to it the signal 12. Shift register 46 generates a sixth output signal 48, at its Q3 output, delayed in time, that is, delayed in time by a predetermined amount equal to four times the repetition rate of the first output signal 28 and commenced by the first occurrence of coincidence between signals 12 and 28. The sixth output signal 48 continues so long as the applied signal 12 continues and for the predetermined amount, which is four times the repetition rate of signal 28, following an interruption of the applied signal 12. The signal 48 is applied to a first input of OR circuit 50 which has applied to its second input the signal 12. The OR circuit 50 acts to develop the presence of the third output signal 44 in response to (1) to the presence of signal 12, or (2) the presence of signal 48. As will be described with regard to FIG. 3c, the absence of a signal 44 following the presence of signal 44 causes the Down Counter 40 to be unconditionally reset. The third output signal 44, in addition to being applied to the APE input of Down Counter 40, is also applied to an Inverter 52.

Inverter 52 generates a seventh output signal 54 in response to the absence of signal 44. The seventh output signal 54 is applied to the analog switch 56. Analog switch 56 is responsive to signal 54 in such a way as to allow bilateral conduction, during the presence of signal 54, from its first end connected to a positive (+) potential to its second end connected to one side of a resistor $R_1$.

Resistor $R_1$ has its second side connected, (1) to a T2 input of a One-Shot device 60, and (2) to one side of a capacitor $C_1$ having its other side connected to the same positive (+) potential which is coupled to Analog switch 56. The values of resistor $R_1$ and capacitor $C_1$ are selected to provide an energy storing means, $R_1C_1$, for accumulating a charge in response to a fourth output signal 42. The fourth output signal 42, to be further discussed with regard to FIG. 3e, is applied to a B input of One-Shot 62 which responds by coupling, via One-Shot 60, its T2 input to a zero potential. For this condition the capacitor $C_1$ has a charging path formed by one of its ends coupled to the positive (+) potential and its other end coupled to the zero potential, via the T2 input, so as to charge capacitor $C_1$ to the voltage potential existing between the positive (+) and zero potentials. The discharging path of capacitor $C_1$ is provided by resistor $R_1$ coupled to the positive (+) potential via the Analog switch 56. The Analog switch 56 is activated during the presence of signal 54 and thus the resistor $R_1$ provides the discharge path of the charged capacitor $C_1$ in response to the presence of signal 54.

The network $R_1C_1$ has a predetermined time constant for the charging and discharging of the $R_1C_1$ network. The time constant of the $R_1C_1$ network establishes the resetting time, to be described hereinafter, desired for the protective relay. A typical value selected for $R_1$ is 220K ohms, whereas, $C_1$ is selected to have a value of 0.027 mf.

The One-Shot device 60 in response to the fourth output signal 42 applied to its B input, in addition to initiating the changing of $C_1$, develops a fifth output signal which is the output signal 62 of the characteristic timer 10. The pulse width of signal 62 developed by One-Shot 60 is typically of a duration of 6.0 msec. However, the pulse width of signal 62 is further controlled by device 56 and extended by the time constant of the $R_1C_1$ network coupled to the T2 input of One-Shot 60.

The operation of the One-Shot device 60, and also the remainder of characteristic timer 10 is best described with reference to the timing diagrams of FIGS. 2, 3 and 4. The description of FIGS. 2, 3 and 4 refers, in part, to the hereinbefore given description of the characteristic timer 10 of FIG. 1. The timing diagrams of FIGS. 2, 3 and 4 are respectively representative of the operation of characteristic timer 10 in response to (1) an uninterrupted periodically occurring applied signal 12 representative of a normal condition of the transmission line, (2) an uninterrupted periodically occurring applied signal 12 representative of an abnormal condition of the transmission line, and (3) an interrupted applied signal 12 or a signal 12 having a "Hole" in its pulse width which represents that a transient has occurred within the transmission line, but the transient is not of a sufficient duration to represent that an abnormal condition exists in the transmission line. As will be hereinafter described with regard to FIG. 4, the characteristic timer 10 "rides over" the "Hole" in the applied signal 12. The three different operations of the characteristic timer 10 in response to three different types of applied signal 12 provide one output signal 62 for reliable control of the external circuit breaker. The characteristic timer 10 is adapted to various conditions inherent in the protected portion of the high voltage transmission line and its output signal 62 is substantially free of an erroneous response to the applied signal 12.

FIG. 2 shows an uninterrupted periodically occurring applied signal 12 (FIG. 2a) for which it is desired that characteristic timer 10 measure the pulse width or its time duration relative to the frequency of the power source supplying the transmission line. The time duration of signal 12 of FIG. (2a) is shown as a time $t_1$ having one duration of <90°. The upper portion of FIG. 2, and also FIG. 4, is incremented in a cyclic manner, such as 0°, 45°, 90°, 180°, 270°, 0° and 90°. As previously discussed, a pulse width of 90° is representative of a 4.16 msec or a 5.0 msec time duration for a 60 Hz or a 50 HZ application, respectively.

For the hereinafter given description, any pulse width of signal 12 less than 90° represents that normal conditions exist in the transmission line, whereas, any pulse width equal to or greater than 90° represents that abnormal conditions exist in the transmission line. This 90° limit is a preselected phase angle limit and as will be apparent hereinafter, if desired, any other preselected phase angle limit may be easily chosen.

The first output signal 28 is shown (FIG. 2b) as a pulse train. The signal 28 of FIG. 2b is the time base for the remaining signals shown in FIG. 2. Similarly, the signals 28 of FIG. 3b and FIG. 4b are the time base for the other signals of FIG. 3 and FIG. 4 respectively. The repetition rate shown for the pulse trains 28 of FIGS. 2b, 3b, and 3c is meant to represent a time duration corresponding to one (1) degree of the applicable frequency 60 HZ or 50 HZ.

FIG. 2 shows the operation of characteristic timer 10 in response to a determination that the pulse width of the applied signal 12 is <90°. More particularly, FIG. 2c shows the signal 42 remaining in its High condition which is representative that the Down Counter 40, having a preselected desired angle of 90°, has not been counted down to zero, which, in turn, allows the One-Shot 60 to remain in its non-activated state shown as signal 62 (FIG. 2i) being maintained in its Low condition. FIG. 2 further shows the response of OR circuit 50 to the applied signal 12 by its generation of the High condition of signal 44 (FIG. 2c). FIG. 2 also shows the response of shift register 46 to the coincidence between the applied signal 12 and signal 28 by its generation of the High condition of signal 48 lagging the initial coincidence occurrence of signals 12 and 28 by a duration 49 equal to three (3) times the repetition rate of signal 28. The further operations of the characteristic timer 10 related to signals 42, 44 and 48 is best described with regard to FIG. 3.

The time frame of FIG. 3 is shown to be compressed relative to FIG. 2, that is, FIG. 3 shows the upper portion in cyclic manner of 0°, 90°, 180°, 270° . . . 90°, whereas, FIG. 2 was shown as 0°, 45°, 90°, . . . 90°. The operation of the characteristic timer 10 of FIG. 3 is best described by, (1) discussing its operation relative to the phase angle of the applied signal in excess of 90° (>90°), and then (2) discussing its operation relative to enhance the resetting time of the protective relay.

The operation of FIG. 3 is primarily related to the counting down of Down Counter 40 to a predetermined value, which, in turn, causes signal 42 of FIG. 3e to transition from a High to a Low condition. This transition is shown to occur at an event 64 shown in the bottommost portion of FIG. 3 and reference to the uppermost 90° increment of FIG. 3. This event 64 represents that the total periodically occurring coincidences, between signals 12 and 28, has decremented the Down Counter 40 from its initial digital contents, representative of the desired 90° preselected phase angle, to a zero condition. The zero condition causes Down Counter 40 to generate the Low condition of signal 42 (FIG. 3c).

The generation of Low condition of signal 42 (FIG. 3c) in turn activates the One-shot 60 whose activation is shown as causing signal 62 (FIG. 3i) to transition from its Low to its High condition shown on FIG. 3i as an event 63 (TRIP). The event 63 (TRIP) is meant to represent that a TRIP signal is sent to the external circuit breaker (not shown) to cause the circuit breaker to isolate the portion of the transmission line, related to the protective relay having the characteristic timer 10, from the remainder of the transmission line. The duration of the pulse width of signal 62 is related to the desired resetting time of the protective relay system which includes the protective relay. More particularly, the final portion of pulse width of signal 62 is related to the desired and enhanced resetting time of this invention. The enhancement of the resetting time is best described with reference to FIGS. 3e, 3f, 3h and 3i.

FIG. 3e shows the generation of the discussed Low condition of signal 42, which, in turn, initiates the generation of signal 62 (FIG. 3i). Still further, the generation of the Low condition of signal 42 initiates the charging of the $R_1C_1$ network to be further described with reference to portions 70A(1), 70A(2) and 70A(3) of FIG. 3h. The Low condition of signal 42 which has a duration equal to the repetition rate of signal 28 is further shown in FIG. 3e, and also by an event 64(1) at the bottom portion of FIG. 3.

FIG. 3c shows signal 44 remaining in its High condition until (1) the applied signal 12 (FIG. 3a) has returned to its Zero condition, and (2) the output of shift register 46, which is signal 48 of FIG. 3d, has returned to its Low condition. Signal 44 transitions from its High to Low condition, shown by an event 66 (1) at the bottommost portion of FIG. 3, upon the attainment of the zero condition and low condition of signals 12 and 48 respectively. This transition of signal 44 unconditionally resets the Down Counter 40 to its initial digital content representative of the desired 90° phase angle setting.

FIG. 3f shows signal 54 transitioning from its Low to its High condition upon the occurrence of event 66 (1). The High condition of signal 54 initiates a discharge of the voltage stored across the $R_1C_1$ network. As mentioned, the voltage is stored across the $R_1C_1$ network in response to the Low condition of signal 42. The discharge of $R_1C_1$ network coupled to the T2 input of One-shot 60 maintains, extends, and determines the pulse width of the signal 62 of FIG. 3i.

The conditions of the charged and discharged states of $R_1C_1$ network are shown in FIG. 3h. The charged state of $R_1C_1$ network is shown as portions $70_{A(1)}$, $70_{A(2)}$ and $70_{A(3)}$. The discharging states of $R_1C_1$ is shown in FIG. 3h as portions $70_{B(1)}$, $70_{B(2)}$, $70_{C(1)}$, $70_{C(2)}$ and $70_D$.

One portion $70_{A(1)}$ is shown as commencing at the event 64 (1) and terminating at an event 66 (1). At event 66 (1) the High condition of signal 52 is applied to the Analog switch 56 of FIG. 1, which, in turn, initiates a discharge of the $R_1C_1$ network shown by the occurrence of the portion $70_{B(1)}$ of FIG. 3h. The discharge voltage of the $R_1C_1$ network is applied to the T2 input of One-shot 60, which, in turn, responds by maintaining the High condition of signal 62 of FIG. 3f. The portion $70_{B(1)}$ is shown as being terminated or interrupted at the occurrence of event 68 (1) located at the bottommost portion of FIG. 3. The event 68 (1) is shown in FIG. 3 as being in coincidence with the second occurrence of signal 12 of FIG. 3a. The second occurrence of signal 12 causes the transition of signal 54 (FIG. 3f) from its High to its Low condition for the reasons previously described. The Low condition of signal 54 interrupts the discharge of the $R_1C_1$ network. The interrupted or intermediate discharge state of $R_1C_1$ is shown in FIG. 3h as the portion $70_{C(1)}$. From FIG. 3h it is noted that the amplitude of the portion $70_{C(1)}$ is less than the amplitude of initial condition of signal 58. The portion $70_{C(1)}$ is terminated and the state of discharge condition of the $R_1C_1$ network is returned to a charged condition shown as $70_{A(2)}$ upon the transition of signal 42 from its High to its Low condition which occurs for the reasons and conditions previously discussed. The transition of signal 44 from its High to its Low condition resets the Down Counter 40 for the reasons previously discussed. Upon the transition of signal 54 from its Low to its High condition 66 (2), the R $C_1$ network again starts its discharge, shown as a second portion $70_{B(2)}$, which, in turn, maintains the High state of signal 62.

FIG. 3 shows a third occurrence of the applied signal 12 of FIG. 3a and also by the event 68 (2) at the bottommost portion of FIG. 3, which, in turn, (1) terminates the portion $70_{B(2)}$, and (2) initiates portion $70_{C(2)}$. The portion $70_{C(2)}$ is terminated and portion $70_{A(3)}$ is initiated by the third transition of signal 44 of FIG. 3c which is also shown as event 64 (3) at the bottommost portion of FIG. 3. The portion $70_{A(3)}$ is terminated and the portion $70_D$ of FIG. 3h is initiated upon the third transition of signal 54 from its Low to its High condition for the reasons previously given. From FIG. 3h it should be noted that portion $70_D$ is of a longer duration than the previously described portions $70_{B(1)}$ and $70_{B(2)}$. The time duration of portion $70_D$ determined by the time constant selected for the $R_1C_1$ network. Further, from FIG. 3i it is noted that the High condition of signal 62 is terminated, shown as occurring at an event 72 related to both FIGS. 3h and 3i, when the amplitude of portion $70_D$ equals the amplitude of initial value of signal 58 of FIG. 3h. Still further, from FIGS. 3h and 3i, it is noted that the time duration of portion $70_D$ is shown as being a duration 74 (R.S.) extending from event 66 (3) to the event 72. The duration 74 (R.S.), which is determined by portion $70_D$ is the desired resetting time of the protective relay.

The substantial discharge of the $R_1C_1$ network shown by portion $70_D$ is allowed to occur because the condition of the transmission line has been returned to a normal condition as manifested by the lack of any further occurrence of applied input 12 after its third occurrence.

The characteristic timer 10 constantly monitors for the presence or absence of signal 12. The presence of signal 12 is immediately measured to detect any possible alarm condition within the transmission line, and similarly, the absence of signal 12 is immediately sensed and anticipates as an indication of a return to a normal condition within the transmission line so as to start the resetting time of the protective relay which also determines the resetting time of the protective relay scheme. The characteristic timer 10 operating in such a manner as to immediately start the resetting time of the protective relay upon the possible return of the transmission line 12 to a normal condition reduces the resetting time to its shortest value and thus enhances the resetting response of the protective relay, which, in turn, enhances the resetting time of the protective relay system. The characteristic timer 10 providing the enhanced resetting time also provides the ability to adapt or adjust to a possible transient or "hole" condition within the transmission line that may be manifested by transient conditions of the applied signal 12. The response of the characteristic timer 10 to a transient condition of signal 12 is best described with reference to FIG. 4.

FIG. 4 shows a first occurrence of the applied signal 12 (FIG. 4a) as having a space or "Hole" in its pulse width. The pulse width of the first occurrence of signal 12 of FIG. 4a is further shown as having durations $d_1$ and $d_2$, and also as having an expression $d_1 + d_2 = t_1 < 90°$. This expression is meant to represent that the first occurrence of applied signal 12 has a pulse width with an overall duration of less than 90°, which, as previously discussed with regard to FIG. 2, is representative that a normal condition exists within the transmission line. The characteristic timer 10 in response to this normal condition, that is <90°, "rides over" the "Hole" in the applied signal 12.

The characteristic timer 10 in response to the first occurrence of signal 12 initiates its decrementing of the Down Counter 40 in a manner as described with regard to FIG. 2. The initial contents of the Down Counter 40 is initially decremented at the repetition rate of signal 48 (FIG. 4b) for an initial time duration represented by the duration $d_1$ of FIG. 4a. As seen in FIG. 4a, when the duration $d_1$ is terminated, the initial portion of the Hole of FIG. 4a is initiated. The extent or duration of the Hole of FIG. 4a is meant to be representative of a time duration which is less than three (3) times the repetition rate of signal 28. As previously discussed, the repetition rate of signal 28 represents one (1) degree of one-cycle of the 60 HZ or 50 HZ power source. Thus, the Hole in signal 12 is meant to be representative of a duration which is less than 3 degrees relative to the 60 HZ or 50 HZ power source. The characteristic timer 10, more particularly, the operation of the characteristic timer 10 that develops signals 44 (FIG. 4c) and 48 (FIG. 4d) rides over this Hole condition.

Signal 44 is generated by an OR type logic function developed by signal 12 or signal 48. The initial portion of signal 44 of FIG. 4c is generated by the initial occurrence of signal 12, but the remaining portion of signal 44 is maintained by either the presence of signal 12 or the presence of signal 48 which, as previously discussed with regard to FIG. 3, occurs four degrees (four (4) times the repetition rate of signal 28) after the initial occurrence of signal 12 and which is delayed in time by the time duration 49 discussed with regard to FIG. 2. The signal 48 of FIG. 4d maintains the High condition of signal 44 during the duration of the Hole condition of signal 12. The maintenance of signal 44 in its High condition inhibits the resetting of the Down Counter 40 during the Hole duration of signal 12. It should be noted that if this Hole duration was greater than 4°, relative to the 60 HZ or 50 HZ power source, then the signal 48 would transition from a High to a Low condition (not shown in FIG. 4) and the Down Counter 40 would be reset to its initial desired digital content representative of the phase angle of 90°. However, for the condition shown in FIG. 4, the characteristic timer 10 rides over the Hole, restarts the decrementing of Down Counter 40 upon the occurrence of the $d_2$ duration of signal 12, and determines that the total pulse width of signal 12 is less than 90° as manifested by the signal 42 of FIG. 4e being maintained in its High condition; however, if $d_1+d_2$ was greater than 90° a trip would be produced.

It should now be appreciated that the characteristic timer 10 of the present invention comprised of digital devices provides the art of protective relays with (1) means for easily selecting the activation response of the protective relay, (2) a means for reducing and enhancing the resetting time of the protective relay, which in turn enhances the overall resetting time of the protective relay scheme, (3) means for the protective relay for eliminating erroneous response to a transient but normal type condition in the transmission line, (4) a highly secure characteristic timer for a protective relay that is easily adaptable to various power sources, such as 60 HZ, supplying the protected transmission line.

It should be further appreciated that although COUNTER 40 has been described as a down-type counter it may also be an up-type counter. The type of COUNTER 40 used need only have its initial digital contents altered to a preselected desired phase angle in response to the occurrence of the second output signal 32.

Still further, although three elements, Clock Source 14, Divide Counter 20, and Frequency Select 25 are shown in FIG. 1 and described for generating the first output signal 28 of the characteristic timer 10, if desired these elements may be combined into one element so long as an output signal 28 is developed having a frequency proportional to the frequency of the power source which is supplying the transmission line.

While the invention has been particularly shown and described with references to several preferred embodiments thereof, it will be understood by those skilled in the art that various changes in form and detail may be made therein without departing from the true spirit and scope of the invention as defined by the appended claims.

What I claim is:

1. A characteristic timer for a protective relay that measures the time duration of an applied signal which is representative of a normal or abnormal condition of a portion of a transmission line associated with said protective relay, said characteristic timer measuring the time duration of the applied signal relative to the frequency of the power source supplying said transmission line, said characteristic timer comprising:

(a) means including a clock source for developing a first output signal having a frequency proportional to the frequency of said power source;
(b) means responsive to coincidence between the applied signal and the first output signal for generating a second output signal having a frequency equal to the frequency of the first output signal when there is coincidence between said applied signal and said first output signal;
(c) selectable means for selecting a first digital signal representative of a desired angle within the range of 0 to 180 degrees of one cycle of the frequency of said power source;
(d) means for developing a third output signal in response to the occurrence of a hole in said applied signal having a duration less than a predetermined amount;
(e) a digital counter for receiving said second and third output signals and said first digital signal and having:
 (1) an initial digital content established in response to said first digital signal,
 (2) a digital content that is altered in response to said second output signal,
 (3) a digital content that is unconditionally resettable to its initial digital content in response to the absence following the presence of said third output signal, and
 (4) means for generating a fourth output signal upon the occurrence of its digital content being altered to a predetermined quantity; and,
(f) means responsive to the fourth output signal for developing a fifth output signal that extends past termination of said fourth output signal.

2. The characteristic timer as defined in claim 1 in which said means for developing said third output signal comprises:

(a) means comprising a shift register for generating a sixth output signal delayed in time by a predetermined amount relative to the first occurrence of coincidence between the applied signal and the first output signal;
(b) means comprising an OR circuit for receiving as a first input said sixth signal and a second input said applied signal and acting to develop said third output signal in response to the presence of either of said two inputs.

3. The characteristic timer of claim 2 in which the sixth output signal continues so long as said applied signal continues and for said predetermined amount following interruption of said applied signal.

4. The characteristic timer of claim 1 in which said means for developing said fifth output signal comprises:

(a) means for developing a seventh output signal in response to the absence of said third output signal,
(b) energy storing means for accumulating a charge in response to said fourth output signal,
(c) means for discharging said energy storing means during the absence of said seventh output signal,
(d) and means responsive to said discharge for extending the duration of said fifth signal while said discharge is occurring.

* * * * *